US008325620B2

(12) United States Patent
Chou

(10) Patent No.: US 8,325,620 B2
(45) Date of Patent: Dec. 4, 2012

(54) METHOD AND SYSTEM OF COMMUNICATION EMPLOYING SPATIAL REUSE RESERVATION PROTOCOL

(75) Inventor: Chun-Ting Chou, Taipei (TW)

(73) Assignee: Koninklijke Philips Electronics N.V., Eindhoven (NL)

(*) Notice: Subject to any disclaimer, the term of this patent is extended or adjusted under 35 U.S.C. 154(b) by 141 days.

(21) Appl. No.: 12/522,960

(22) PCT Filed: Jan. 10, 2008

(86) PCT No.: PCT/IB2008/050082
§ 371 (c)(1),
(2), (4) Date: Nov. 5, 2010

(87) PCT Pub. No.: WO2008/087569
PCT Pub. Date: Jul. 24, 2008

(65) Prior Publication Data
US 2011/0038355 A1 Feb. 17, 2011

Related U.S. Application Data

(60) Provisional application No. 60/885,175, filed on Jan. 16, 2007, provisional application No. 60/983,632, filed on Oct. 30, 2007.

(51) Int. Cl.
*H04L 12/56* (2006.01)
*H04J 1/16* (2006.01)
(52) U.S. Cl. ......... 370/252; 370/329; 370/430; 370/442
(58) Field of Classification Search .................. 370/252, 370/329, 430, 442
See application file for complete search history.

(56) References Cited

U.S. PATENT DOCUMENTS
6,804,208 B2 * 10/2004 Cain et al. ..................... 370/326
2004/0162093 A1 8/2004 Bevan
2010/0173586 A1 * 7/2010 McHenry et al. ............... 455/62

OTHER PUBLICATIONS

Yuxin Pan et al., "A Two-Channel Medium Access Control Protocol for Mobile Ad Hoc Networks Using Directional Antennas", Personal, Indoor and Mobile Radio Communications, 2005, PIMRC 2005, IEEE 16th International Symposium on Berlin, Germany, Sep. 11-14, Piscataway, NJ, USAS, vol. 2, Sep. 11, 2005, pp. 1361-1365, XP010926335.

(Continued)

*Primary Examiner* — John Pezzlo
(74) *Attorney, Agent, or Firm* — Larry Liberchuk

(57) ABSTRACT

A wireless device (200, 310-1) executes a method (400) of reserving a time slot for communication with a second wireless device (200, 310-4) in a communication network 5 (300). The wireless device (200, 310-1) determines whether any antenna beam to be used in a proposed communication with the second wireless device (200, 310-4) communication within the time slot would interfere with any antenna beam used by any first wireless device (**200, 310-*i*) in any existing reservations for the time slot. When any antenna beam to be used in the proposed communication would not interfere with any antenna beam used 10 by any first wireless device (200, 310-*i*) in any existing reservations for the time slot, the wireless device (200, 310-1) transmits an information element (500) or reserving the time slot for communication with the second wireless device (200, 310-4**).

18 Claims, 5 Drawing Sheets

OTHER PUBLICATIONS

S. Bandyopadhyay et al., "An Adaptive MAC Protocol for Wireless Ad Hoc Community Network (WACNet) Using Electronically Steerable Passive Array Radiator Antenna", Globecom '01, 2001 IEEE Global Telecommunications Conference, New York, NY, IEEE US, vol. 5, Nov. 25, 2001, pp. 2896-2900, XP010747563.

T Ueda et al., "An Adaptive Media Access Control Protocol and System Performance of Wireless Ad Hoc Network Using Smart Antenna", Electronics & Communications in Japan, Part 1—Communications, Wiley, vol. 87, No. 3, Part 1, Mar. 1, 2004, pp. 50-56, XP001185658.

Ko Young-Bae et al., "Medium Access Control Protocols Using Directional Antennas in Ad Hoc Networks", INFOCOM 2000, 19th Annual Joint Conference of the IEEE Computer and Communications Societies, Proceedings, vol. 1, Mar. 26, 2000, pp. 13-21, XP010376001.

R.R. Choudhury et al., "Using Directional Antennas for Medium Access Control in Ad Hoc Networks", proceedings of the 8th Annual International Conference on Mobile Computing and Networking, MOBICOM 2002, vol. conf 8, Sep. 23, 2002, pp. 59-70, XP001171456.

* cited by examiner

METHOD AND SYSTEM OF COMMUNICATION EMPLOYING SPATIAL REUSE RESERVATION PROTOCOL

CROSS-REFERENCES TO RELATED APPLICATIONS

This patent application claims the priority benefit under 35 U.S.C. §119(e) of U.S. Provisional Patent Application 60/885,175, filed on 16 Jan. 2007, the entirety of which is hereby incorporated by reference as if fully set forth herein.

TECHNICAL FIELD

This invention pertains to the field of wireless communications, and more particularly to a system and method of wireless communication in a communication network that employs directional antennas.

BACKGROUND AND SUMMARY

In next-generation wireless communication networks, operating frequencies are in many cases much higher than in previous systems. For example, some of these networks operate at frequencies in the range of several GHz, or even higher. Unfortunately, signals that are broadcast or transmitted at these higher frequencies suffer substantially greater attenuation—particularly when passing through intervening objects such as walls in a building—compared to signals at lower operating frequencies. As a result, unless transmitter power levels are substantially increased (which is often not permissible), then communication ranges for wireless devices operating at these higher frequencies are substantially reduced.

One solution to mitigate the problems of these higher frequency bands is the use of directional antennas by the wireless devices. As is well known, when the beamwidth of a transmitting or broadcasting antenna pattern is reduced, an antenna gain is achieved which has an effect as if the transmitter power level has been increased. Similarly, when the beamwidth of a receiving antenna pattern is reduced, an antenna gain is achieved which has an effect as if the received power level has been increased. By employing directional antennas with sufficiently narrow beamwidths (i.e., sufficient antenna gains) for transmission and reception, wireless devices are able to operate at higher frequency bands while still maintaining an acceptable communication range.

An additional benefit of a communication network where wireless devices use directional antennas for transmission and/or reception is spatial reuse. That is, wireless devices may point their antenna beams at different directions and transmit simultaneously without interfering with each other. For example, FIG. 1A illustrates a communication network 10 where only wireless device 12A or wireless device 12C can transmit at any given time. Otherwise, transmissions from wireless device 12A and transmissions from wireless device C will collide at devices 12B and 12D. In contrast, FIG. 1B illustrates a communication network 20 with spatial reuse. In communication network 20, device 22A can communicate with device 22D at the same time while device 22C communicates with device 22B. Compared to communication network 10 illustrated in FIG. 1A, communication network 20 illustrated in FIG. 1B—which employs spatial reuse—can double the spectral efficiency.

To enable spatial reuse, wireless devices must be aware not only of the durations of ongoing transmissions in the wireless network, but also the directions of the transmissions. For example, in FIG. 1B wireless device 22A must know at which direction wireless device 22B's antenna is pointed so that wireless device 22A's transmission will not collide with other transmissions received at wireless device 22B. Moreover, wireless device 22A also has to ensure that transmissions from wireless devices 22B and 22C will not interfere with proper reception of other transmissions (e.g., an ACK from device 22D) at its own receiver.

Therefore, a wireless device in a communication network employing spatial reuse should initiate a new communication only when its proposed communication will not cause interference to ongoing communications in the wireless network.

Accordingly, in a communication network which employs spatial reuse and resource reservations, any new reservations which would cause interference to existing communications should be prevented. And in particular, in a distributed communication network without a central controller which employs spatial reuse and resource reservations, the wireless devices should refrain from establishing new reservations that will cause interference to ongoing communications in the wireless network.

Accordingly, it would be desirable to provide a method and protocol for establishing resource reservations in a communication network employing spatial reuse that ensures that any new reservations do not cause interference to existing communications in the wireless network. It would also be desirable to provide a wireless device which executes a method for establishing resource reservations in a communication network employing spatial reuse that ensures that any new reservations do not cause interference to existing communications in the wireless network.

In one aspect of the invention, a method is provided for reserving a time slot for communication between a first wireless device and a second wireless device in a communication network. The method includes searching information elements in a beacon received from a beaconing device in the communication network to find any existing reservations for the time slot, the information elements identifying wireless devices and associated antenna beams employed in existing reservations. When no existing reservations are found for the time slot, the method includes transmitting an information element for reserving the time slot for communication between the first wireless device and the second wireless device. When one or more existing reservations are found for the time slot, the method includes: searching the information elements in the beacon received from the beaconing device to find any other wireless devices and associated antenna beams communicating in any existing reservations for the time slot, checking a local database of wireless devices and antenna beams to determine whether any antenna beam to be used in a proposed communication between the first wireless device and the second wireless device would interfere with the other wireless devices and associated antenna beams communicating in the one or more existing reservations for the time slot, and transmitting the information element for reserving the time slot for communication between the first wireless device and the second wireless device, when any antenna beam to be used in the proposed communication between the first wireless device and the second wireless device would not interfere with any antenna beam used by any other wireless device in any existing reservations for the time slot.

In another aspect of the invention, a method is provided of reserving a time slot for communication between a first wireless device and a second wireless device in a communication network. The method comprises: determining, at the first wireless device, whether any antenna beam to be used in a proposed communication between the first wireless device and the second wireless device within the time slot would interfere with any antenna beam used by any other wireless device in any existing reservations for the time slot; and transmitting an information element for reserving the time slot for communication between the first wireless device and the second wireless device, when any antenna beam to be used in the proposed communication between the first wireless device and the second wireless device would not interfere with any antenna beam used by any other wireless device in any existing reservations for the time slot.

In still another aspect of the invention, a wireless device adapted to operate in a communication network, comprises: a directional antenna system adapted to communicate in a plurality of different directions in the communication network; and a processor adapted to execute a method comprising the steps of: determining whether any antenna beam to be used in a proposed communication with the second wireless device within the time slot would interfere with any antenna beam used by any other wireless device in any existing reservations for the time slot, and causing the wireless device to transmit an information element for reserving the time slot for communication with the second wireless device, when any antenna beam to be used in the proposed communication between the first wireless device and the second wireless device would not interfere with any antenna beam used by any other wireless device in any existing reservations for the time slot.

DETAILED DESCRIPTION

Figure 1A:
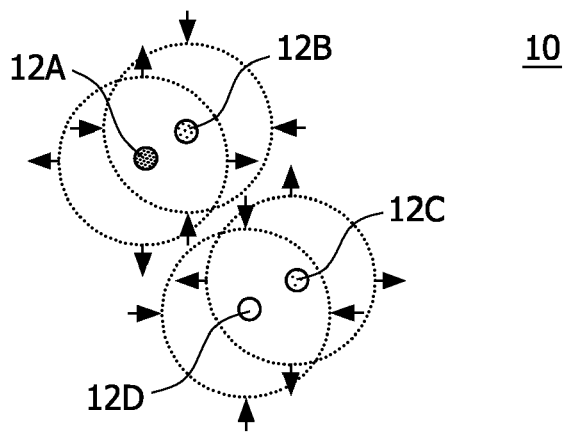
FIG. 1A illustrates a communication network including wireless devices employing omni-directional antennas.
Figure 1A:
Figure 1A:
Figure 1B:
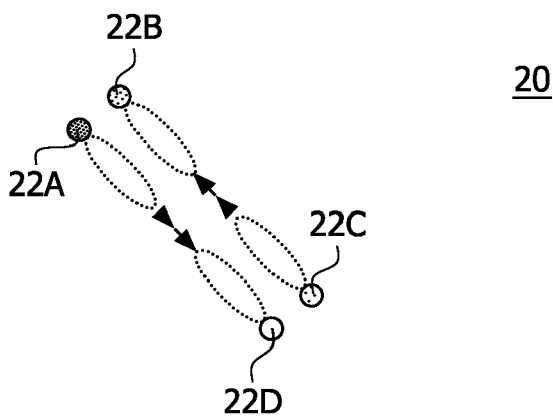
FIG. 1B illustrates a communication network employing spatial reuse including wireless devices employing directional antennas.
Figure 1B:
Figure 1B:
Figure 2:
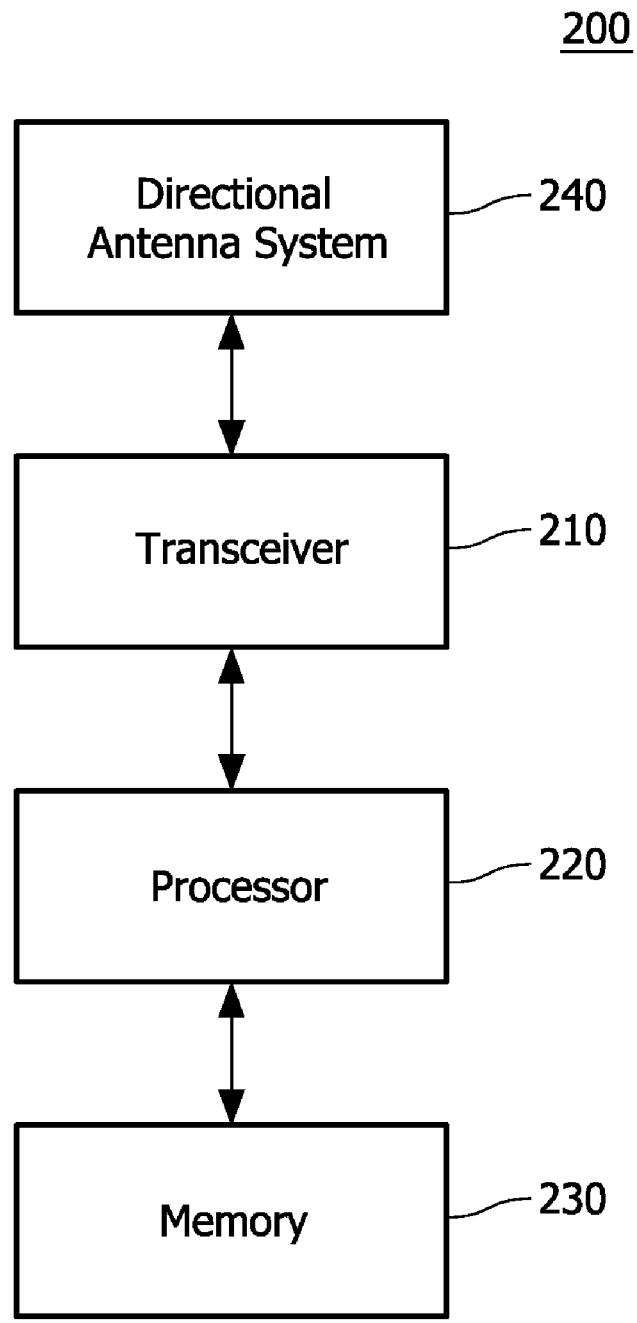
FIG. 2 is a functional block diagram of one embodiment of a wireless device.

FIG. 2 is a functional block diagram of a wireless device 200. As will be appreciated by those skilled in the art, one or more of the various "parts" shown in FIG. 2 may be physically implemented using a software-controlled microprocessor, hard-wired logic circuits, or a combination thereof. Also, while the parts are functionally segregated in FIG. 2 for explanation purposes, they may be combined variously in any physical implementation.

Wireless device 200 includes a transceiver 210, processor 220, memory 230, and a directional antenna system 240.

Transceiver 210 provides functionality for wireless device 200 to communicate with other wireless devices in a communication network according to the standard protocols of the wireless network. For example, in one embodiment wireless device 200 is adapted to communicate in a communication network that operates according to IEEE 802.11.

Processor 220 is configured to execute one or more software algorithms in conjunction with memory 230 to provide the functionality of wireless device 200. Beneficially, processor 220 includes its own memory (e.g., nonvolatile memory) for storing executable software code that allows it to perform the various functions of wireless device 200. Alternatively, the executable code may be stored in designated memory locations within memory 230.

Directional antenna system 240 provides a capability for wireless device 200 to select from a plurality of antenna beams for communicating with other wireless devices in a plurality of directions. In one embodiment, directional antenna system 240 comprises a plurality of antennas each corresponding to one antenna beam. In another embodiment, directional antenna system 249 comprises a steerable antenna that can combine a plurality of different antenna elements to form a beam in a plurality of different directions.

Figure 3:
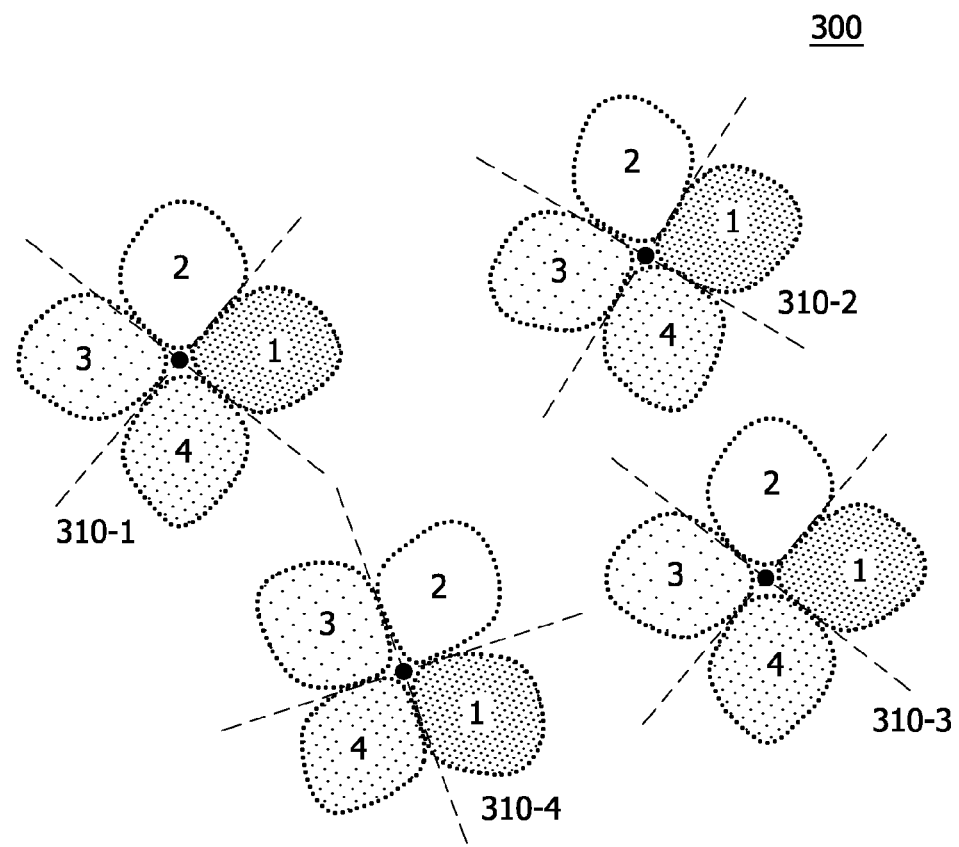
FIG. 3 illustrates one embodiment of a communication network.

FIG. 3 illustrates one embodiment of a communication network 300 including wireless devices 310-1, 310-2, 310-3 and 310-4.

Beneficially, communication network 300 is a distributed network without a central controller for the wireless devices 310-1 through 310-4. Also beneficially, each of the wireless devices 310-1 through 310-4 employ directional antennas, and communication network 300 employs spatial reuse. Communication network 300 supports resource reservations. In particular, communication network 300 communicates in a series of back-to-back "superframes." Each superframe comprises a plurality of time slots (e.g., 256 time slots/superframe). Furthermore, communication network 300 includes a first beaconing device that creates a beacon period within each superfrane, with the beacon period further comprising a plurality of beacon slots. Each beaconing device broadcasts beacons in communication network 300 within each beacon period. Each beacon can further include one or more information elements as will be discussed in greater detail below.

Beneficially, each wireless device 310-$i$ includes a database of information regarding the directions of its neighboring wireless devices 310 and the directions of some or all of their antenna beams. In particular, each wireless device 310-$i$ stores information that can be used to determine, for each of its antenna beams, which other wireless devices 310, and associated antenna beams, in the communication network 300 interfere with that antenna beam. Such information can be obtained via beacons received from neighbors, or may be obtained via an on-demand neighbor discovery protocol, which is outside the scope of this disclosure. Also, each of the wireless devices 310-1 through 310-4 may be configured in accordance with wireless device 200 of FIG. 2. In that case, the database may be stored in memory 230.

Therefore, it is assumed here that each device has stored the information regarding the relative directions of its neighboring wireless devices and their associated antenna beams. For example, as shown in FIG. 3, wireless device 310-1 knows that it should use beam #1 to communicate with wireless device 310-2, and device 320-2 knows to use beam #3 when communicating with wireless device 310-1.

Accordingly, a method of establishing resource reservations in communication network 300 will now be explained with respect to FIGS. 3-5.

Figure 4:
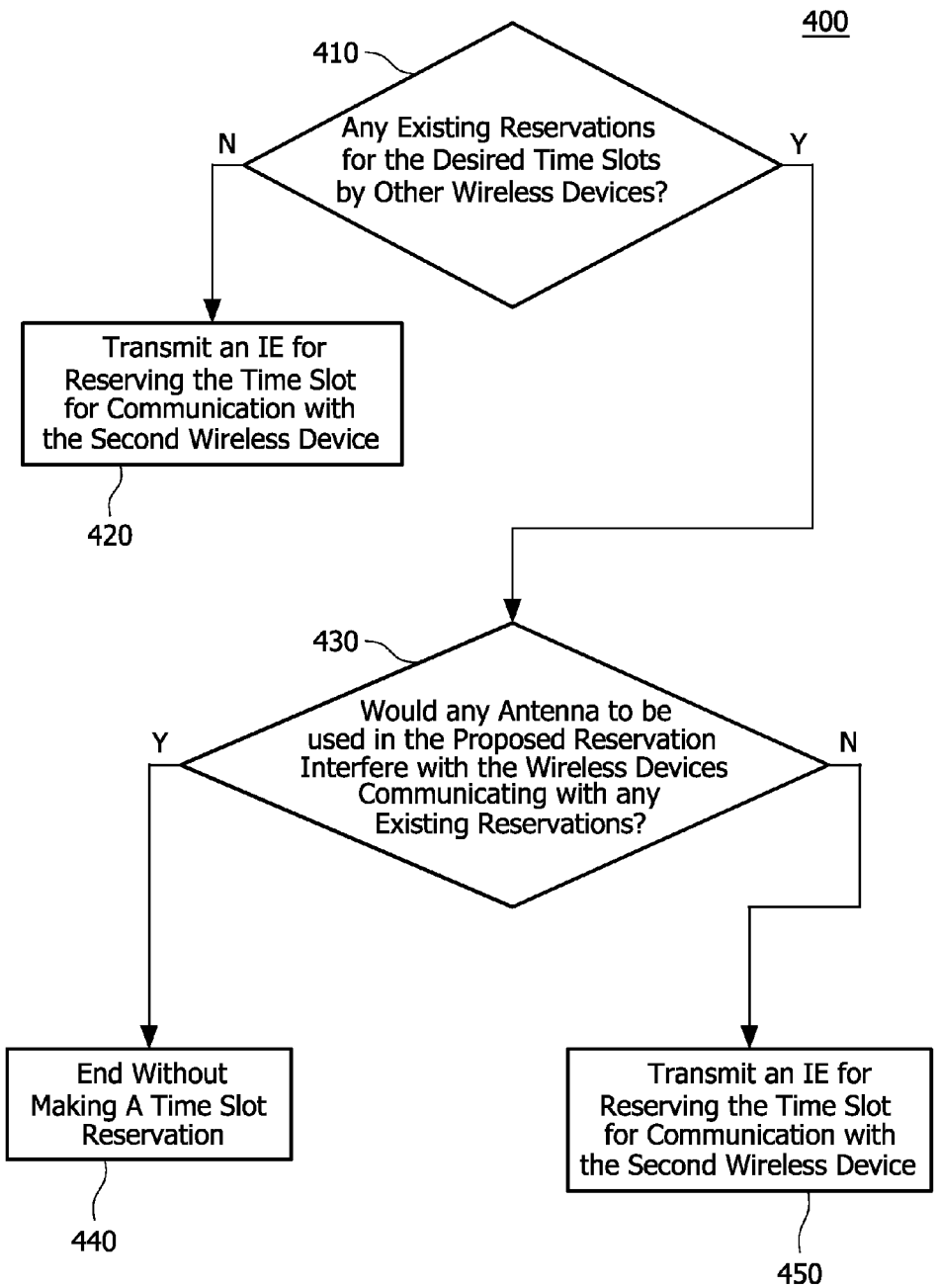
FIG. 4 is a flowchart illustrating one embodiment of a method of establishing resource reservations in a communication network.

FIG. 4 is a flowchart illustrating one embodiment of a method of establishing resource reservations in communication network 300. In particular, FIG. 4 illustrates a method of reserving one or more time slots for communication between a first wireless device and a second wireless device in communication network 300.

In a first step 410, a first wireless device (e.g., 310-1) checks to determine if the desired time slot(s) have already been reserved for use by other wireless devices. Beneficially, wireless device 310-1 makes this determination by comparing the information elements in beacons received from one or more other beacon devices, against a database of information regarding the utilization of all time slots, directions of its neighboring wireless devices 310-$i$ and the directions of their antenna beams used in their reservation(s).

If the time slot(s) have no existing reservations and are therefore available, then in a step 420 wireless device 310-1 transmits an information element (IE) in its beacon for reserving the time slot(s) for communication with a second wireless device (e.g., 310-4).

Figure 5:
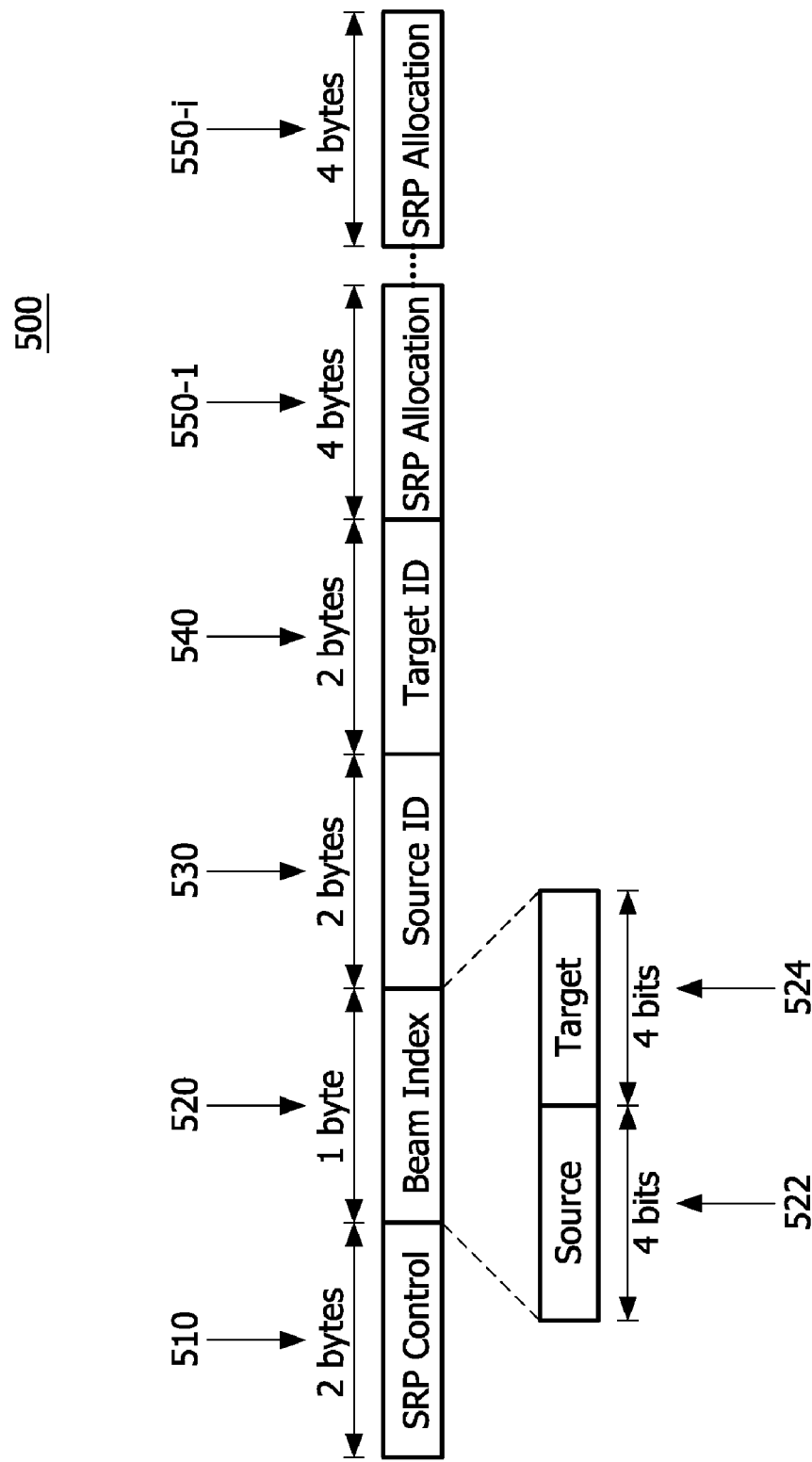
FIG. 5 illustrates one embodiment of an information element that may be transmitted for reserving a time slot in a communication network.

FIG. 5 illustrates one embodiment of an information element (IE) 500 that may be transmitted for requesting a reservation in a time slot in communication network 300. Information element 500 includes: a Control field (e.g., Spatial-reuse Reservation Protocol (SRP) Control field) 510, a Beam Index field 520, a Source ID field 530, a Target ID field 540, and one or more Allocation (e.g., SRP Allocation) fields 550$i$. Beam Index field 520 includes a Source Beam Index subfield 522 and a Target Beam Index subfield 524.

When wireless device 310-1 transmits the information element 500 for requesting a reservation of the time slot(s) for communication with a second wireless device (e.g., 310-4), then it includes a beam number in Source Beam Index subfield 522 identifying a beam index that will be used by first wireless device 310-1 in the proposed communication. However, it leaves Target Beam Index subfield 524 empty and to be filled-in by the second wireless device 310-4 when it confirms the reservation request. Also, a reservation status bit in Control field 510 is set (e.g., set to 0) to indicate that the IE 500 is a request for a reservation.

Turning again to FIG. 4, if the desired time slot(s) are unavailable (i.e., one or more existing reservations overlap with the requested time slots), then in a step 430, wireless device 310-1 checks to determine if any beam index of any existing reservation matches with any index of the beams which wireless device 310-1 and its intended target wireless device 310-4 will use for the proposed communication.

If there is a match, then wireless device 310-1 cannot establish this reservation as it implies potential interference, and the process ends at a step 440.

Otherwise, then in a step 450 wireless device 310-1 initiates the desired reservation request by adding an information element (IE) 500 in its beacon.

When wireless device 310-4 receives a beacon with IE 500 whose Target ID matches the device's own ID, then wireless device repeats steps 410-430 above with the exception that the reservation status bit is set (e.g., to 1 if the proposed reservation is feasible) in IE 500 to indicate that the is a confirmation of the reservation of the one or more time slots for communication between the first wireless device 310-1 and the second wireless device 310-4, and Target Beam Index subfield 524 is filled-in with a beam number identifying a beam index that will be used by second wireless device 310-4 in the communication.

Concrete examples will now be explained with respect to FIG. 3. Here, each wireless device has 4 beams to choose for communicating with its neighbors. Assume that wireless devices 310-2 and 310-3 have established a reservation for communication. Now wireless device 310-1 tries to reserve the same time slot(s) for communication between itself and wireless device 310-4. Since wireless device 310-1 is aware—from the IE(s) 500 in the beacons sent by the beaconing devices—that wireless devices 310-2 and 310-2 are using beams #4 and #2, it knows that the new reservation, once established, will not interfere with wireless devices 310-2 or 310-3 as wireless device 310-1 will use beam # 4. Wireless device 310-1 will then include an IE 500 in its beacon and eventually device 310-4 will receive this IE 500.

Wireless device 310-4 will then follow the same procedure and realize that its beam #3 will not interfere with transmissions by wireless devices 310-2 and 310-3. Therefore, a new reservation is established. It should be noted that in this specific scenario, only when wireless device 310-1 uses beam #1 will it possibly interfere with wireless device 310-2 or 310-3. On the other hand, wireless device 310-1, even using beam #1, will never interfere with transmission between wireless devices 310-2 and 310-3).

Now consider a case where devices 310-1 and 310-2 have established a reservation. Now device 310-3 tries to establish a reservation, using the same time slots, with device 310-4. However, since device 310-3 knows that devices 310-1 and 310-2 are using beams #1 and #3 in their reservation, it also realizes that it cannot use beam #3 to communicate with device 310-4 as using beam #3 will cause collision at device 310-1. Therefore, simultaneous transmissions between devices 310-1/310-2 and wireless devices 310-3/310-4 are infeasible While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A method of reserving a time slot for communication between a first wireless device and a second wireless device in a communication network, the method comprising:
  searching information elements in a beacon received from a beaconing device in the communication network to find any existing reservations for the time slot, the information elements identifying wireless devices and associated antenna beams employed in existing reservations;
  when no existing reservations are found for the time slot, transmitting an information element for reserving the time slot for communication between the first wireless device and the second wireless device;
  when one or more existing reservations are found for the time slot:
    searching the information elements in the beacon received from the beaconing device to find any other wireless devices and associated antenna beams communicating in any existing reservations for the time slot,
    checking a local database of wireless devices and antenna beams to determine whether any antenna beam to be used in a proposed communication between the first wireless device and the second wireless device would interfere with the other wireless devices and associated antenna beams communicating in the one or more existing reservations for the time slot,
    transmitting the information element for reserving the time slot for communication between the first wireless device and the second wireless device, when any antenna beam to be used in the proposed communication between the first wireless device and the second wireless device would not interfere with any antenna beam used by any other wireless device in any existing reservations for the time slot;
  receiving at the second wireless device a beacon including the information element for reserving the time slot for communication between the first wireless device and the second communication device;

determining, at the second wireless device, whether any antenna beam to be used in the proposed communication within the time slot between the first wireless device and the second wireless device would interfere with any antenna beam used by any first wireless device in any existing reservations for the time slot; and transmitting a second information element confirming the reservation of the time slot for communication between the first wireless device and the second wireless device, when any antenna beam to be used in the proposed communication between the first wireless device and the second wireless device would not interfere with any antenna beam used by any first wireless device in any existing reservations for the time slot.

2. The method of claim 1, wherein the information element for reserving the time slot for communication between the first wireless device and the second wireless device includes:
   a source ID field identifying the first wireless device;
   a target ID field identifying the second wireless device;
   a source beam field identifying an antenna beam to be used by the first wireless device in the proposed communication; and
   a reservation status bit indicating a request for a reservation of the time slot for communication between the first wireless device and the second wireless device.

3. The method of claim 1, wherein the first information element for reserving the time slot for communication between the first wireless device and the second wireless device includes:
   a source ID field identifying the first wireless device;
   a target ID field identifying the second wireless device;
   a source beam field identifying an antenna beam to be used by the first wireless device in the proposed communication; and
   a reservation status bit indicating a request for a reservation of the time slot for communication between the first wireless device and the second wireless device,
   wherein the second information element confirming the reservation of the time slot for communication between the first wireless device and the second wireless device includes:
   the source ID field identifying the first wireless device;
   the target ID field identifying the second wireless device;
   the source beam field identifying the antenna beam to be used by the first wireless device in the proposed communication;
   a target beam field identifying an antenna beam to be used by the second wireless device in the proposed communication; and
   a reservation status bit indicating a confirmation of the reservation of the time slot for communication between the first wireless device and the second wireless device.

4. A method of reserving a time slot for communication between a first wireless device and a second wireless device in a communication network, the method comprising:
   determining, at the first wireless device, whether any antenna beam to be used in a proposed communication between the first wireless device and the second wireless device within the time slot would interfere with any antenna beam used by any other wireless device in any existing reservations for the time slot;
   transmitting an information element for reserving the time slot for communication between the first wireless device and the second wireless device, when any antenna beam to be used in the proposed communication between the first wireless device and the second wireless device would not interfere with any antenna beam used by any other wireless device in any existing reservations for the time slot;
   receiving at the second wireless device a beacon including the information element for reserving the time slot for communication between the first wireless device and the second communication device;
   determining, at the second wireless device, whether any antenna beam to be used in the proposed communication within the time slot between the first wireless device and the second wireless device would interfere with any antenna beam used by any other wireless device in any existing reservations for the time slot; and
   transmitting a second information element confirming the reservation of the time slot for communication between the first wireless device and the second wireless device, when any antenna beam to be used in the proposed communication between the first wireless device and the second wireless device would not interfere with any antenna beam used by any other wireless device in any existing reservations for the time slot.

5. The method of claim 4, wherein determining whether any antenna beam to be used in the proposed communication within the time slot between the first wireless device and the second wireless device would interfere with any antenna beam used by any first wireless device in any existing reservations for the time slot comprises searching information elements in a beacon received from beaconing devices in the communication network.

6. The method of claim 4, further comprising:
   receiving at the second wireless device a beacon including the information element for reserving the time slot for communication between the first wireless device and the second communication device;
   determining, at the second wireless device, whether any antenna beam to be used in the proposed communication within a time slot between the first wireless device and the second wireless device would interfere with any antenna beam used by any first wireless device in any existing reservations for the time slot; and
   transmitting a second information element confirming the reservation of the time slot for communication between the first wireless device and the second wireless device, when any antenna beam to be used in the proposed communication between the first wireless device and the second wireless device would not interfere with any antenna beam used by any first wireless device in any existing reservations for the time slot.

7. The method of claim 4, wherein determining whether any antenna beam to be used in the proposed communication within the time slot between the first wireless device and the second wireless device would interfere with any antenna beam used by any first wireless device in any existing reservations for the time slot, comprises:
   receiving one or more information elements identifying wireless devices and associated antenna beams employed in one or more existing reservations; and
   checking a local database of wireless devices and antenna beams to determine whether any antenna beam to be used in the proposed communication between the first wireless device and the second wireless device would interfere with any of the associated antenna beams.

8. The method of claim 7, where the local database includes information identifying any of the wireless devices and associated antenna beams that would interfere with antenna beams of the second wireless device.

9. The method of claim 7, wherein receiving one or more information elements identifying wireless devices and associated antenna beams employed in one or more existing reservations includes receiving a beacon transmitted by a beaconing device in the communication network.

10. The method of claim 4, wherein the information element for reserving the time slot for communication between the first wireless device and the second wireless device includes:
- a source ID field identifying the first wireless device;
- a target ID field identifying the second wireless device;
- a source beam field identifying an antenna beam to be used by the first wireless device in the proposed communication; and
- a reservation status bit indicating a request for a reservation of the time slot for communication between the first wireless device and the second wireless device.

11. The method of claim 4, wherein the second information element confirming the reservation of the time slot for communication between the first wireless device and the second wireless device includes:
- the source ID field identifying the first wireless device;
- the target ID field identifying the second wireless device;
- the source beam field identifying an antenna beam to be used by the first wireless device in the proposed communication
- a target beam field identifying an antenna beam to be used by the second wireless device in the proposed communication; and
- a reservation status bit indicating a confirmation of the reservation of the time slot for communication between the first wireless device and the second wireless device.

12. A wireless device adapted to operate in a communication network, the wireless device comprising:
- a directional antenna system adapted to communicate in a plurality of different directions in the communication network; and
- a processor adapted to execute a method comprising:
- determining whether any antenna beam to be used in a proposed communication with the second wireless device within the time slot would interfere with any antenna beam used by any first wireless device in any existing reservations for the time slot, and
- causing the wireless device to transmit an information element for reserving the time slot for communication with the second wireless device, when any antenna beam to be used in the proposed communication with the second wireless device would not interfere with any antenna beam used by any other wireless device in any existing reservations for the time slot;
- receiving at the second wireless device a beacon including the information element for reserving the time slot for communication between the first wireless device and the second communication device;
- determining, at the second wireless device, whether any antenna beam to be used in the proposed communication within the time slot between the first wireless device and the second wireless device would interfere with any antenna beam used by any other wireless device in any existing reservations for the time slot; and
- transmitting a second information element confirming the reservation of the time slot for communication between the first wireless device and the second wireless device, when any antenna beam to be used in the proposed communication between the first wireless device and the second wireless device would not interfere with any antenna beam used by any other wireless device in any existing reservations for the time slot.

13. The wireless device of claim 12, wherein determining whether any antenna beam to be used in the proposed communication within the time slot with the second wireless device would interfere with any antenna beam used by any other wireless device in any existing reservations for the time slot comprises searching information elements in a beacon transmitted by a beaconing device in the communication network.

14. The wireless device of claim 12, further comprising a database storing information for each antenna beam of the wireless device indicating which other wireless devices, and associated antenna beams, in the communication network interfere with the antenna beam.

15. The wireless device of claim 14, wherein determining whether any antenna beam to be used in the proposed communication with the second wireless device would interfere with any antenna beam used in the one or more existing reservations, comprises:
- processing one or more received information elements identifying wireless devices and associated antenna beams employed in one or more existing reservations; and
- comparing the wireless devices and associated antenna beams employed in one or more existing reservations with the information in the database.

16. The wireless device of claim 12, wherein the information element for reserving the time slot for communication with the second wireless device includes:
- a source ID field identifying the wireless device;
- a target ID field identifying the second wireless device;
- a source beam field identifying an antenna beam to be used by the wireless device in the proposed communication; and
- a reservation status bit indicating a request for a reservation of the time slot for communication with the second wireless device.

17. The wireless device of claim 12, wherein the directional antenna system comprises a plurality of antennas each corresponding to one antenna beam.

18. The wireless device of claim 12, wherein the directional antenna system comprises a steerable antenna.

* * * * *